US008463923B2

(12) United States Patent
Butt et al.

(10) Patent No.: US 8,463,923 B2
(45) Date of Patent: Jun. 11, 2013

(54) ENHANCED ZONING USER INTERFACE FOR COMPUTING ENVIRONMENTS

(75) Inventors: Kevin D. Butt, Tucson, AZ (US); Louie A. Dickens, Tucson, AZ (US); Laurence W. Holley, Tucson, AZ (US); Antonio Y. Pacheco, Vail, AZ (US); Nancy V. Ryson, Tucson, AZ (US); Michael E. Starling, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 12/845,625

(22) Filed: Jul. 28, 2010

(65) Prior Publication Data

US 2012/0030599 A1    Feb. 2, 2012

(51) Int. Cl.
 *G06F 15/16*    (2006.01)
(52) U.S. Cl.
 USPC ........... 709/229; 709/220; 709/225; 370/254; 370/400
(58) Field of Classification Search
 USPC ................................................. 370/400–410
 See application file for complete search history.

(56) References Cited

U.S. PATENT DOCUMENTS

| | | | |
|---|---|---|---|
| 7,171,624 B2 | 1/2007 | Baldwin et al. | |
| 7,203,730 B1 | 4/2007 | Meyer et al. | |
| 7,653,712 B1 * | 1/2010 | Dubrovsky et al. | 709/223 |
| 7,685,261 B1 | 3/2010 | Marinelli et al. | |
| 7,934,018 B1 * | 4/2011 | Lavallee et al. | 709/248 |
| 8,160,072 B1 * | 4/2012 | Gnanasekaran et al. | 370/392 |
| 2002/0176417 A1 * | 11/2002 | Wu et al. | 370/389 |
| 2003/0149752 A1 | 8/2003 | Baldwin et al. | |
| 2003/0154271 A1 | 8/2003 | Baldwin et al. | |
| 2003/0208581 A1 | 11/2003 | Behren et al. | |
| 2006/0215663 A1 | 9/2006 | Banerjee et al. | |
| 2006/0245361 A1 * | 11/2006 | Cheethirala et al. | 370/238 |
| 2006/0251111 A1 * | 11/2006 | Kloth et al. | 370/464 |
| 2006/0271677 A1 | 11/2006 | Mercier | |
| 2007/0220204 A1 * | 9/2007 | Nakajima et al. | 711/114 |
| 2009/0222733 A1 | 9/2009 | Basham et al. | |
| 2009/0327902 A1 | 12/2009 | Bethune et al. | |
| 2010/0074137 A1 * | 3/2010 | Banerjee et al. | 370/252 |
| 2011/0090804 A1 * | 4/2011 | Wusirika | 370/252 |
| 2011/0090816 A1 * | 4/2011 | Dutt et al. | 370/254 |
| 2011/0216778 A1 * | 9/2011 | Chung et al. | 370/401 |

OTHER PUBLICATIONS

Cisco Systems, Inc. "Cisco MDS 9000 Family Fabric Manager Configuration Guide, Release 2.x" Oct. 2005.*
Tom Clark, "Designing Storage Area Networks: A Practical Reference for Implementing Fibre Channel and IP SANs, Second Edition", Addison-Wesley Professional, Mar. 21, 2003.*
Dan Branden, Disk Path Design for AIX including SAN Zoning, Apr. 22, 2011, available from http://www-03.ibm.com/support/techdocs/atsmastr.nsf/WebIndex/WP101914.*
Kevin D. Butt et al., U.S. Appl. No. 12/962,856, entitled "Discovery and Management Mechanism for SAN Devices," as filed on Dec. 8, 2010.

* cited by examiner

*Primary Examiner* — Asad Nawaz
*Assistant Examiner* — Zhaohui Yang
(74) *Attorney, Agent, or Firm* — Griffiths & Seaton PLLC

(57) ABSTRACT

Exemplary method, system, and computer program embodiments for managing a computing environment are provided. In one embodiment, a plurality of information, including each of an available plurality of devices, an interconnected plurality of communication paths, and quality of service (QoS) information, is gathered for at least one of the available plurality of devices and the interconnected plurality of communication paths. The plurality of information is organized into a plurality of zones according to a zoning methodology. One of an available plurality of checking operations is performed to verify consistency of the plurality of information, including performing a real-time zone checking operation to determine that at least one of the plurality of zones is functional. The plurality of information, including the at least one of the plurality of zones, is displayed to the user via a graphical user interface (GUI).

19 Claims, 12 Drawing Sheets

| Select One Action to Perform | Action |
|---|---|
|  | Create a Zone Using WWPN's |
| X | Create a Zone Using WWNN |
|  | Create a Quality of Service Zone |
|  | Specify Device Traffic Paths |
|  | See a Graphical View of a Zone |

FIG. 10

ENHANCED ZONING USER INTERFACE FOR COMPUTING ENVIRONMENTS

BACKGROUND OF THE INVENTION

1. Field of the Invention

The present invention relates in general to computers, and more particularly to apparatus, method and computer program product embodiments for management of computing environments, such as data storage environments, using an enhanced zoning user interface.

2. Description of the Related Art

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

These computing storage environments may use many storage devices such as disk drives, often working in concert, to store, retrieve, and update a large body of data, which may then be provided to a host computer requesting or sending the data. In some cases, a number of data storage subsystems are collectively managed as a single data storage system. These subsystems may be managed by host "sysplex" (system complex) configurations that combine several processing units or clusters of processing units. In this way, multi-tiered/multi-system computing environments, often including a variety of types of storage devices, may be used to organize and process large quantities of data.

SUMMARY OF THE DESCRIBED EMBODIMENTS

Storage architectures, as previously mentioned, typically contain a wide variety of storage devices and interconnected components. Many of these devices are identifiable by worldwide name (WWN) information such as a port name or a node name (WWPN/WWNN). In Ethernet environments, these devices may be identified by MAC address. In conventional mechanisms for storage area network (SAN) management, manual entry of such identities is required to perform management tasks for the devices such as the creation of zones of such devices, for example. The manual entry of this information, understandably, consumes time and other resources of system administrators. In addition, the manual configuration of zoning of storage devices is a trial and error process prone to error, without a graphical mechanism of viewing which device or path is in which zone and whether the configuration of one zone impacts another zone in the SAN.

In view of the foregoing, a need exists for a mechanism whereby management operations (such as zoning operations) featuring such identifying characteristics of storage devices and interconnected may be performed in a more resource-efficient manner. Accordingly, exemplary method, system, and computer program embodiments for managing a computing environment (such as a computing storage environment) are provided. In one embodiment, by way of example only, a plurality of information, including information for each of an available plurality of devices, hosts and virtual devices, and available plurality of host and virtual devices, an interconnected plurality of storage paths, and quality of service (QoS) information, is gathered for at least one of the available plurality of devices, hosts, virtual devices, and the interconnected plurality of storage paths. The plurality of information is organized into a plurality of zones according to a zoning methodology.

One of an available plurality of checking operations is performed to verify consistency of the plurality of information, including one of a real-time zone checking operation to determine that at least one of the plurality of zones is at least one of functional and not in conflict with at least one additional zone of the plurality of zones, a checking operation against the at least one additional zone to determine the at least one additional zone is unaffected by a change to the at least one of the plurality of zones, an assist mode operation to provide a response to a user input, and a suggestion mode operation to provide a suggested response to the user input. The plurality of information, including the at least one of the plurality of zones, is displayed to the user via a graphical user interface (GUI).

In addition to the foregoing exemplary embodiment, various other method, apparatus, and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 10 is an additional exemplary display of a GUI according to aspects of the present invention;

DETAILED DESCRIPTION OF THE DRAWINGS

Figure 1:
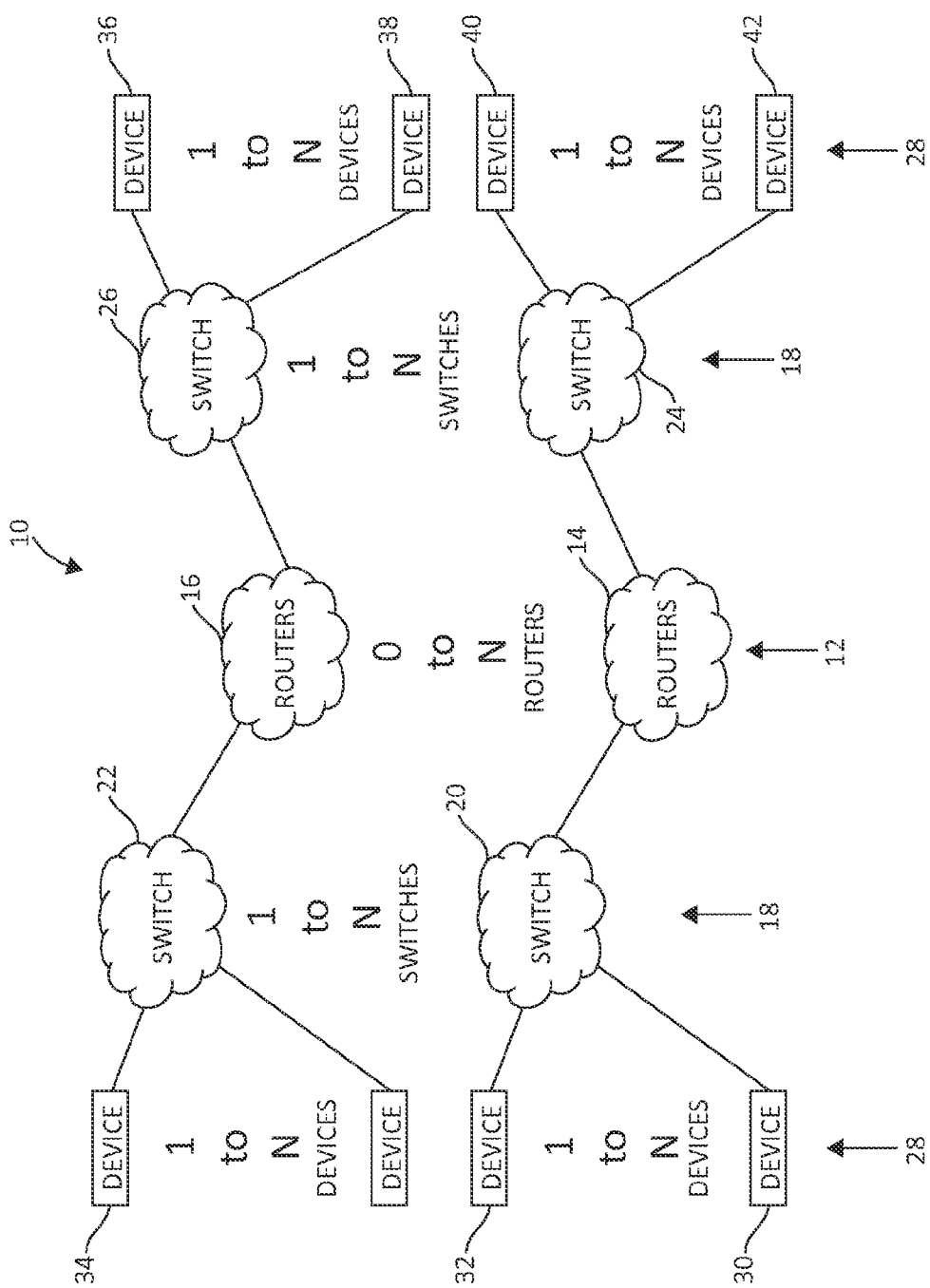
FIG. 1 is a block diagram of an exemplary computing storage environment in accordance with certain embodiments.

The illustrated embodiments provide mechanisms for a user to manipulate a graphical user interface to perform various Storage Area Network (SAN) management and configuration functions such as configuration and management of zones for the interconnected devices and communications paths typically seen in such architectures. The illustrated embodiments, for example, alleviate the necessity for manual entry of device information such as worldwide port name (WWPN) and worldwide node name (WWNN) information to facilitate such zoning operations. In addition, the illustrated embodiments allow for the visualization of such devices (and/or selection of such storage devices from a list of text), including such information, to the user, while allowing for the verification that management and configuration operations are correctly performed on a dynamic basis. This information may include device type, device model, device capacity, number of logical units the device is associated with, and if the device is using an associated security mechanism, for example. The mechanisms of the illustrated embodiments are operable in a variety of computing environments as will be understood by one of ordinary skill in the art, including environments incorporating WWPN and WWNN addressing as previously described, Ethernet and fibre channel over Ethernet, for example.

The mechanisms of the illustrated embodiments include a variety of zoning related checking functionality as will be further described. For example, real-time zone checking functionality is performed to ensure that a particular zone will function properly and/or operate efficiently. Additional checking functionality may be performed to ensure that other preexisting zones are not impacted or affected by a new zoning change, for example. Further checking functionality may be performed as will be described relating to an "assist mode," where the user may specify configuration and management operations in which they would appreciate assistance. The mechanisms of the illustrated embodiments provide possible solutions, in which the user is free to accept, or to modify as they see fit. Further checking functionality may be performed as will be described relating to a "suggestion mode," where the user may ask for a suggestion from the mechanisms of the present invention to solve a particular problem.

The mechanisms of the illustrated embodiments provide for the configuration of several available zoning types, including WWPN, WWNN, specific path selection, and Quality of Service (QoS), in addition to zoning types based on such characteristics as a device type, a device model, a device capacity, a number of logical units assigned to a particular device, and whether a security mechanism is associated with a particular device as will be further described. The configuration of these zoning types, among others, is performed in a manner alleviating manual entry described previously and promoting efficiency and overall system performance. While some zones will be described, following, with specific reference to the illustrated embodiments, one of ordinary skill in the art will appreciate that other zoning types, devices, communication paths, configurations, interfaces, and the like may be facilitated by the mechanisms of the present invention and are contemplated.

Turning now to the drawings, reference is initially made to FIG. 1, which is a block diagram of an exemplary network 10, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities such as various SAN architectures, meta storage networks, and local area networks (LANs) operable in Ethernet environments.

Network 10 includes a number of components (labeled 0 or 1 to N to indicate that any number of such components is contemplated) interconnected as shown via various communication paths. A number of routers 12 are shown interconnected with switches 18 and devices 28 via various communication paths. For example, switch 24 is interconnected between router 14 and devices 40 and 42, while switch 20 is interconnected between devices 30 and 32. Similarly, switch 22 is interconnected between router 16 and device 34, while switch 26 is interconnected between devices 36 and 38.

As one or ordinary skill in the art will appreciate, various components in the network 10 may be arranged in a storage area network (SAN), for example. The connecting paths between various components (such as between device 32 and switch 20) may include technologies such as fibre channel or Ethernet. The network 10 may, for example, operate in or as, a network attached storage (NAS) or a storage subsystem in a SAN architecture.

As one of ordinary skill in the art will appreciate, a number of devices may be incorporated as devices 30, 32, 34, 36, 38, 40, and 42. These may include, without limitation, storage devices such as hard disk drives, virtual devices such as thinly provisioned storage volumes, and other computing components such as processor or memory devices. Each device 30-42 may include additional processing and memory components in communication with other internal or external components connected over a respective data pathway. In one embodiment, a single device 42 may include a number of individual hard disk drive (HDD) devices in a redundant array of independent disks (RAID) configuration. Routers 12 and switches 18 may be adapted as will be appreciated by one of ordinary skill in the art to perform switching and routing functionality, and otherwise provide interface functionality between one or more devices 30-42, for example.

In another embodiment, one or more devices 30-42 may be host devices that are provided storage in response to an input/output (I/O) request, for example. As previously mentioned, the devices 30-42 may be processor devices, including microprocessor hardware as may be appreciated by one of ordinary skill in the art adapted to carry out various mechanisms of the illustrated embodiments as will be described below. For example, one device 42 may be adapted for collecting information for other devices 30-40, related communication paths, switches 18 and routers 12, including such information as WWNN and WWPN information for configuration purposes. In another embodiment, one device 42 may function as a graphical user interface (GUI) as presented on a display screen to a user, again as one of ordinary skill in the art will appreciate.

While not explicitly shown for purposes of illustrative simplicity, one of ordinary skill in the art will appreciate that in some embodiments, the devices 30-42 may be adapted for implementation in conjunction with certain hardware, such as a rack mount system, a midplane, and/or a backplane. Additional hardware such as the aforementioned switches, processors, controllers, memory devices, graphical user interfaces (GUI) and the like may also be incorporated into the devices 30-42 and elsewhere within the network 10, again as the skilled artisan will appreciate. Further, a variety of software components, operating systems, firmware, and the like may be integrated. For example, the devices 30-42 may include an initiator device for controlling a SAN, and include a processor device operable on the initiator device. Again, such variations would be understood by one of ordinary skill in the art.

Figure 2:
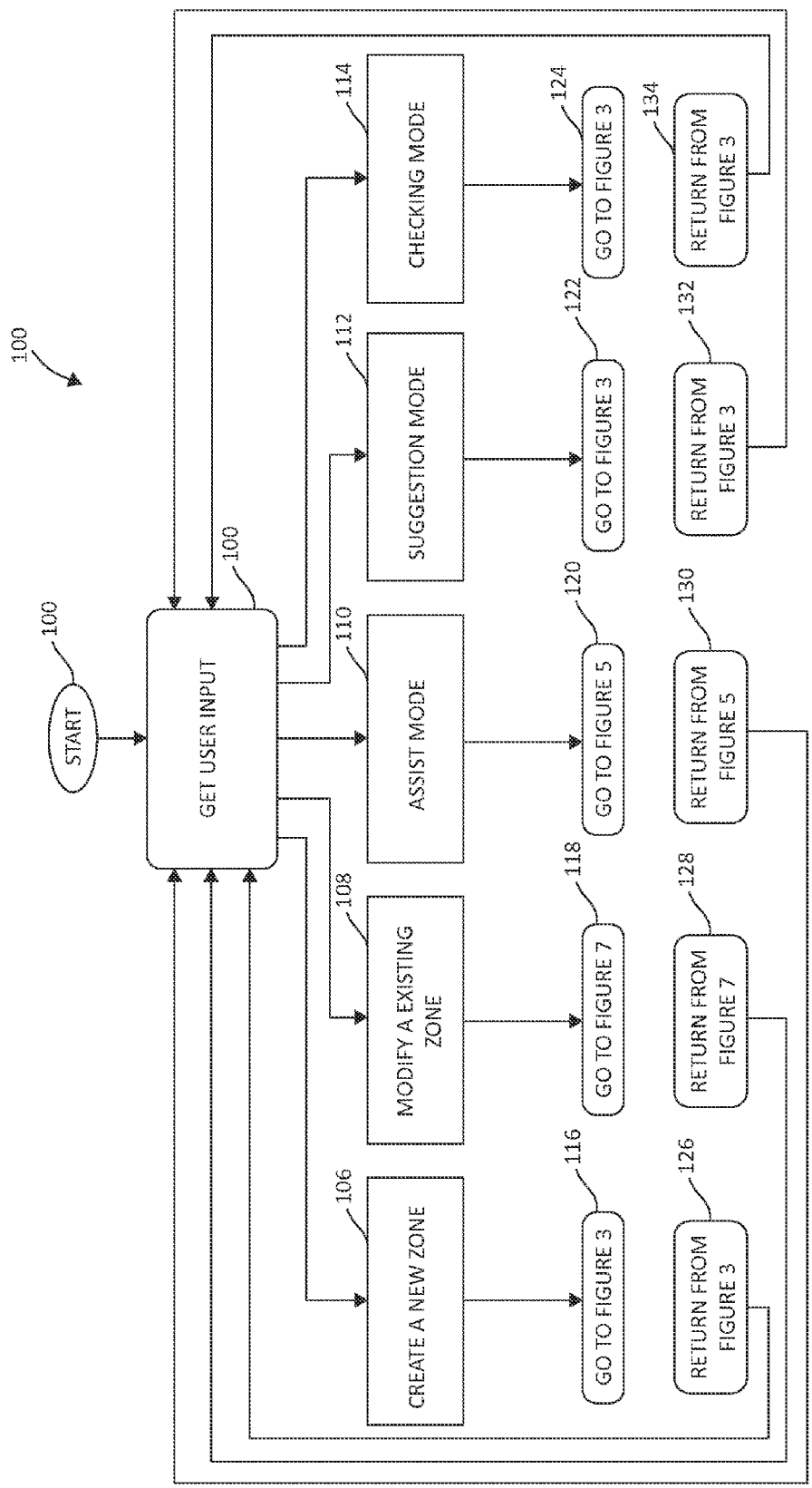
FIG. 2 is a flow chart diagram of an exemplary method for state change notification event processing according to various aspects of the present invention.

FIG. 2 is a flow chart diagram of an exemplary method 100 for operation of a mechanism for facilitating enhanced zoning functionality is depicted. Specifically, the method 100 may be adapted for state change notification event processing according to various aspects of the present invention to facilitate enhanced zoning functionality. In one embodiment, the method 100 represents an overall event-processing diagram, in which various aspects of the present invention are associated. A summary of this processing may be broken down into two portions. In the first, an initialization and setup process is depicted in steps 102, 104, and 106, for example as will be further described. In the second, an event handling process (including providing notification) is depicted in steps 108-120 as will be further described.

Elements of the method 100 may be performed, for example by processor devices incorporated as one or more devices 30-42 (FIG. 1). In one embodiment, the state change processing illustrated in method 100 utilizes an N port identifier. This identifier preferably has the same domain name as the storage component (such as a switch) in which it resides, and should have an identifier that will not be assigned to any other port. The state change processing illustrated in method 100 may, in one embodiment, register a type value that is not currently assigned by a storage standard (such as the Fibre Channel standard). Accordingly, an exemplary value of 27 is contemplated; however any unused value may be selected, as one of ordinary skill in the art will appreciate.

Referring specifically to FIG. 2 now, method 100 starts (step 102) with the receipt of user input (step 104). The user input may be directed to several options, following in steps 106-114, such as creation of a new zone (step 106), modification of an existing zone (step 108), the aforementioned assist mode (step 110), the aforementioned suggestion mode (step 112), and a checking mode (step 114). Each of these options is described in the following figures. Once such functionality is performed, the mechanisms of the present invention return control to step 102 (as shown in steps 126, 128, 130, 132, and 134), where additional user input is obtained.

Figure 3:
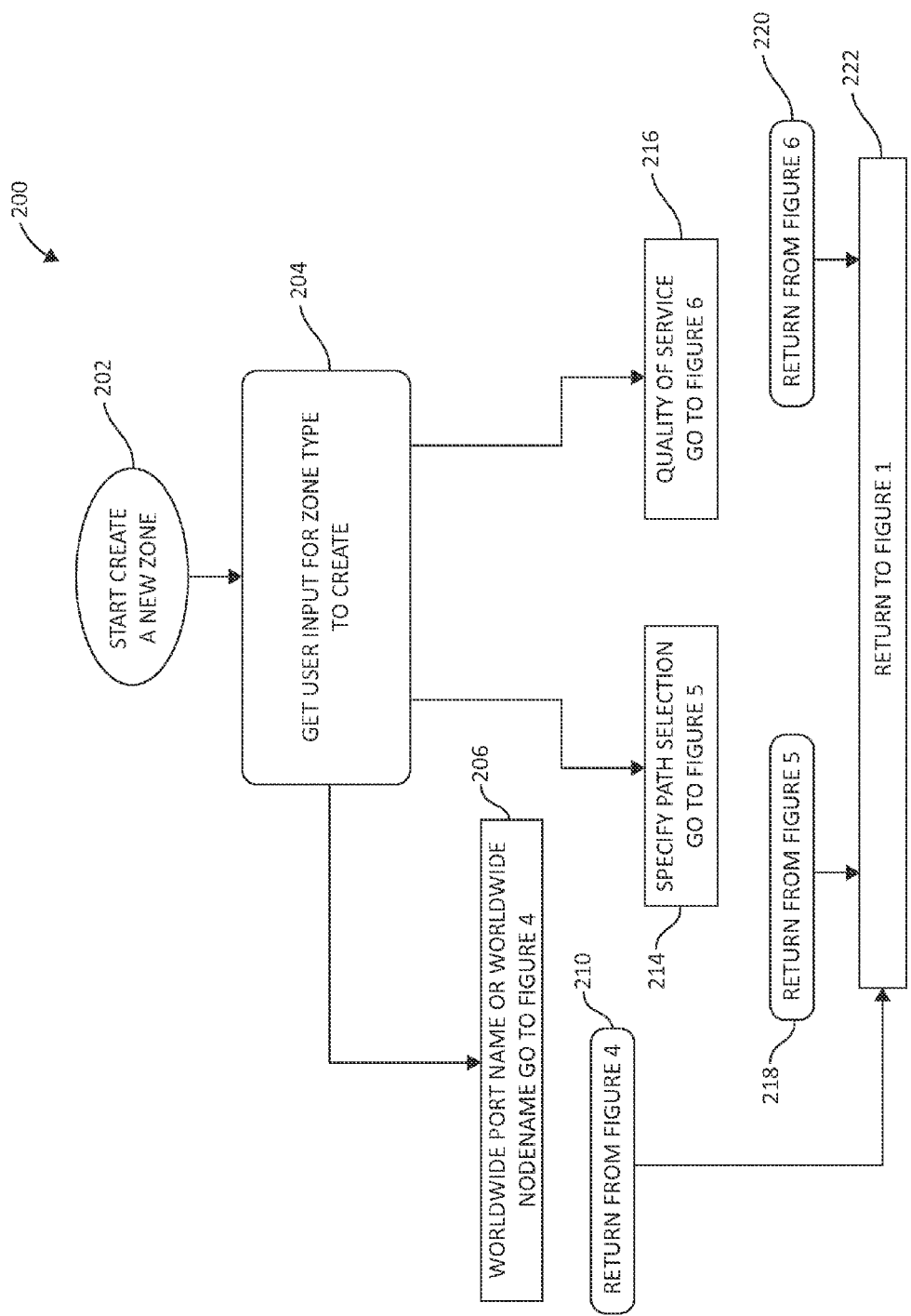
FIG. 3 is a flow chart diagram of an exemplary method for creation of a zone in a computing storage environment.

FIG. 3 is a flow chart diagram of an exemplary method 200 for creation of a zone as previously begun in step 106 of FIG. 2. Method 200 begins (step 202) with the receipt of user input regarding the zone type to create (step 204). If the zone desired to create is a WWPN or WWNN zone, the method 300 then moves to FIG. 4 (step 206) as will be further described. If the zone desired to create is a specified path selection, the method 300 then moves to FIG. 5 (step 214) as will be further described. Finally, if the zone desired to create is a quality of service (QoS) zone, the method 300 then moves to FIG. 6 as will be further described (step 216). Following the completion of the functionality as will be described in FIGS. 4, 5, and 6, following, the method 300 returns to FIG. 1 as illustrated (steps 210, 218, 220, and 222).

Figure 4:
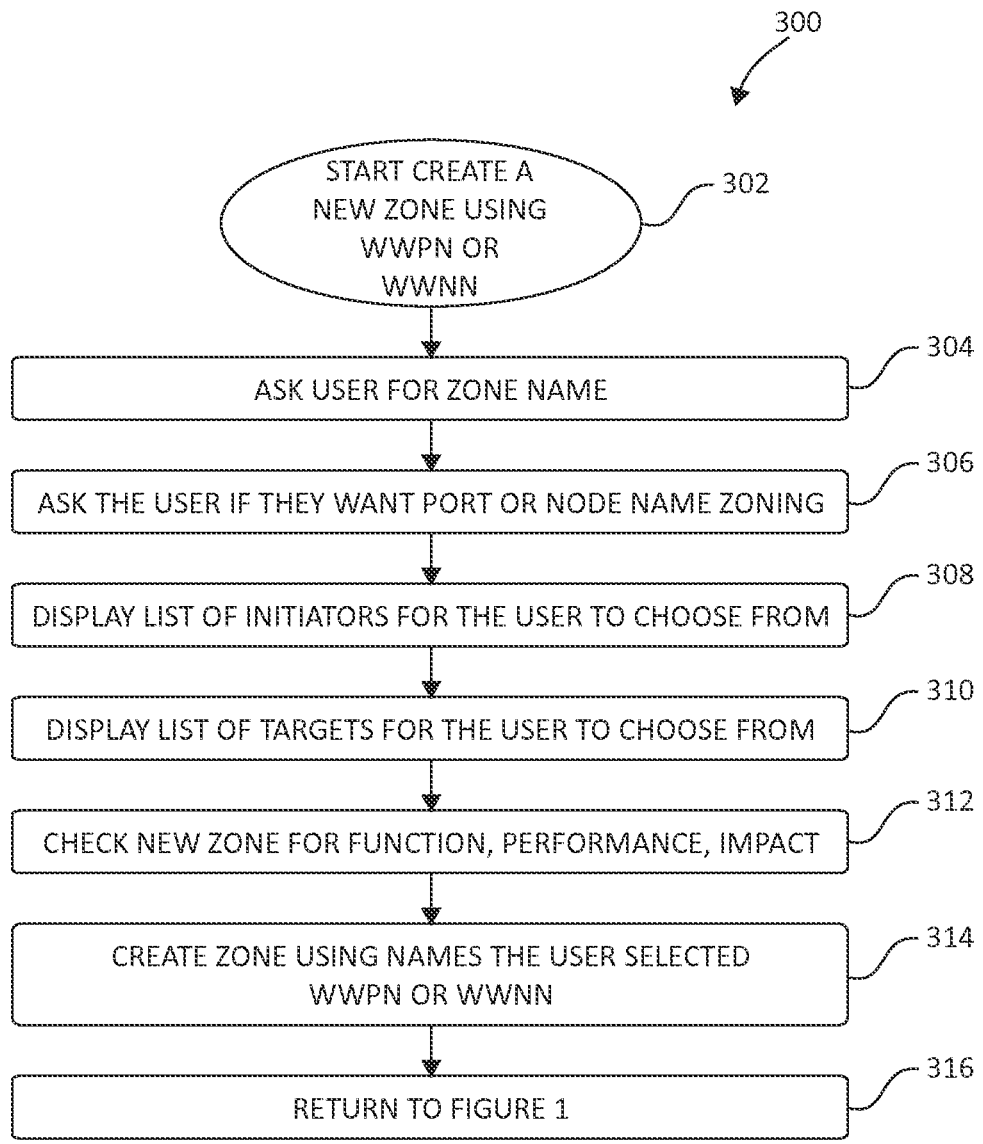
FIG. 4 is a flow chart diagram of an exemplary method for creation of a zone using worldwide port name (WWPN) or worldwide node name (WWNN) based on a user input.

FIG. 4 is a flow chart diagram of an exemplary method 300 for creation of a worldwide port name (WWPN) or worldwide node name (WWNN) based on a user input (as a continuation of step 206 of FIG. 3). Method 300 begins (step 302) with a query to the user for the desired zone name (step 304). The user is queried if they desire port or node name zoning (step 306). In response, a list of initiators for the user to choose from (by model selected by the user) is presented (step 308), as well as a list of available targets (step 310), again by model selected by the user. A checking operation is performed on the selected initiators and targets (collectively forming the zone) to analyze function, performance and other impacts (for example, on existing zones in the computing storage environment). The applicable zone (WWPN or WWNN) is then created using the names the user selected (step 314), and the method 300 returns to FIG. 1 (step 316).

Figure 5:
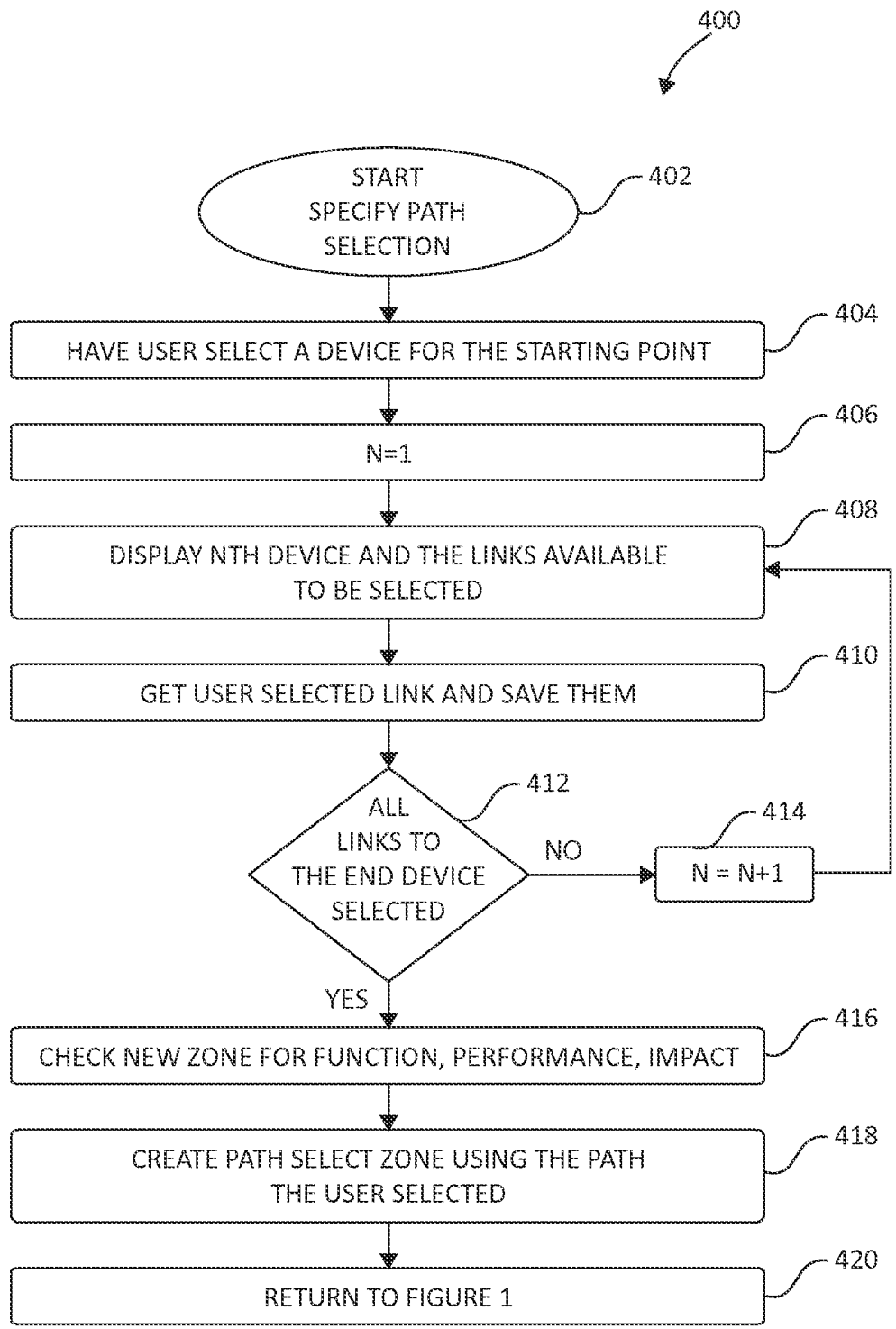
FIG. 5 is a flow chart diagram of an exemplary method for creation of a path selection zone according to aspects of the present invention.

FIG. 5 is a flow chart diagram of an exemplary method 400 for creation of a path selection zone based on a user input (again, as a continuation of step 214 of FIG. 3). Method 400 begins (step 402) with a query for a user-selected device for the starting point of the applicable path (step 404). A value N is assigned as 1 (step 406). The Nth device and the applicable available links to the device are displayed to the user (step 408). The user-selected link(s) are saved (step 410). If all links to the end device are not selected (step 412), the method 400 increments the N value (step 414) and returns to step 408 for an additional iteration (again, steps 408, 410, and 412) (step 416). Alternatively, the new zone is checked for function, performance and other impacts in a manner similar to that previously described (e.g., step 312, FIG. 4). The path select zone is created using the applicable path selected by the user (step 418), and the method 300 returns to FIG. 1 (step 420).

Figure 6:
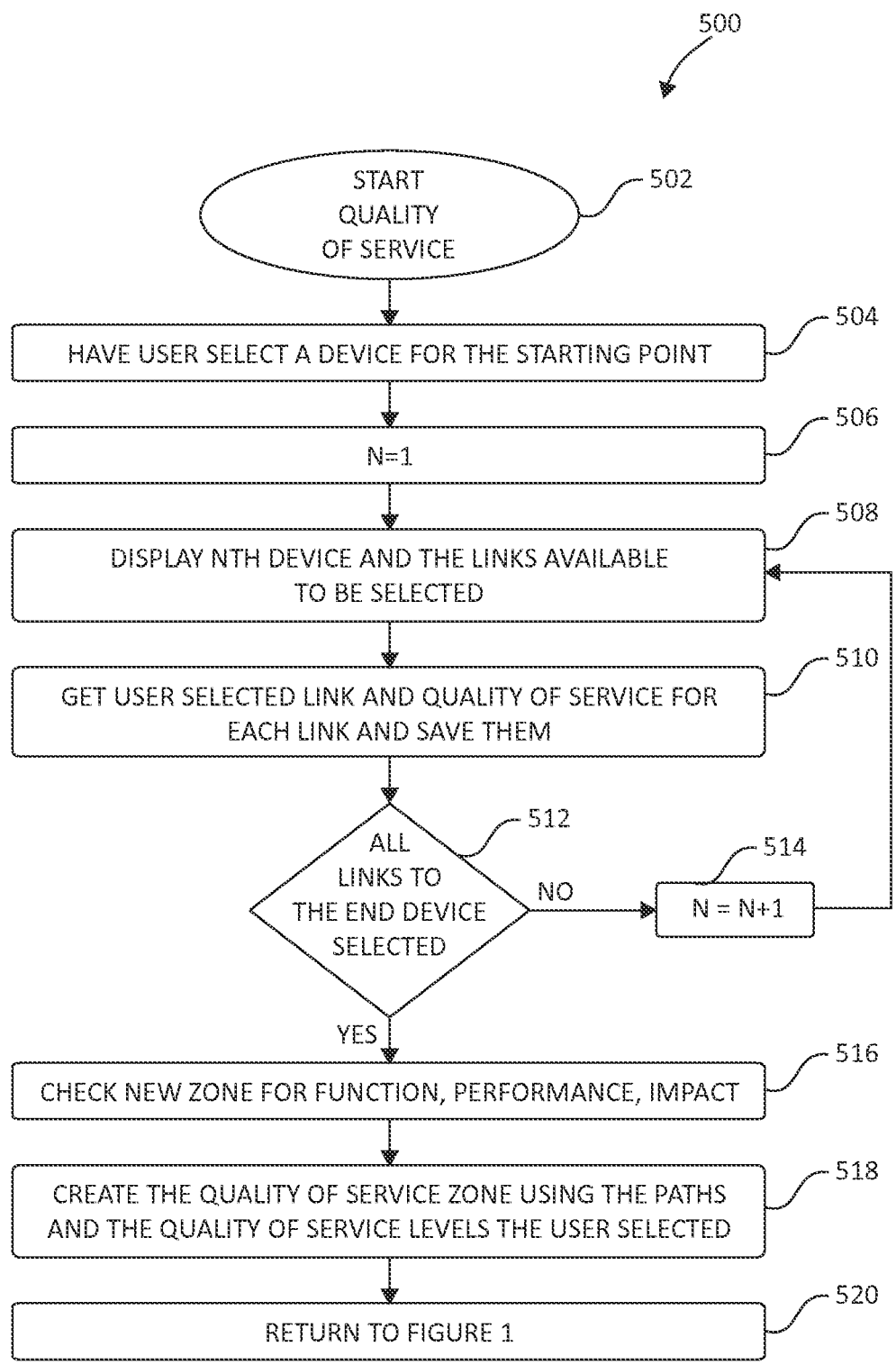
FIG. 6 is a flow chart diagram of an exemplary method for creation and configuration of a zone Quality of Service (QoS)

FIG. 6 is a flow chart diagram of an exemplary method for creation and configuration of Quality of Service (QoS) (again, as a continuation of step 216 of FIG. 3). Method 500 begins (step 502) with a query for a user-selected device for the starting point of the applicable QoS (step 504). A value N is assigned as 1 (step 506). The Nth device and the applicable available links to the device are displayed to the user (step 508). The user-selected link(s), and the QoS for each selected link are saved (step 510). If all links to the end device are not selected (step 512), the method 500 increments the N value (step 514) and returns to step 508 for an additional iteration (again, steps 508, 510, and 512). Alternatively, the new zone is checked for function, performance and other impacts in a manner similar to that previously described (again, e.g., step 312, FIG. 4) (step 516). The path select zone is created using the applicable path selected by the user (step 518), and the method 500 returns to FIG. 1 (step 520).

Figure 7:
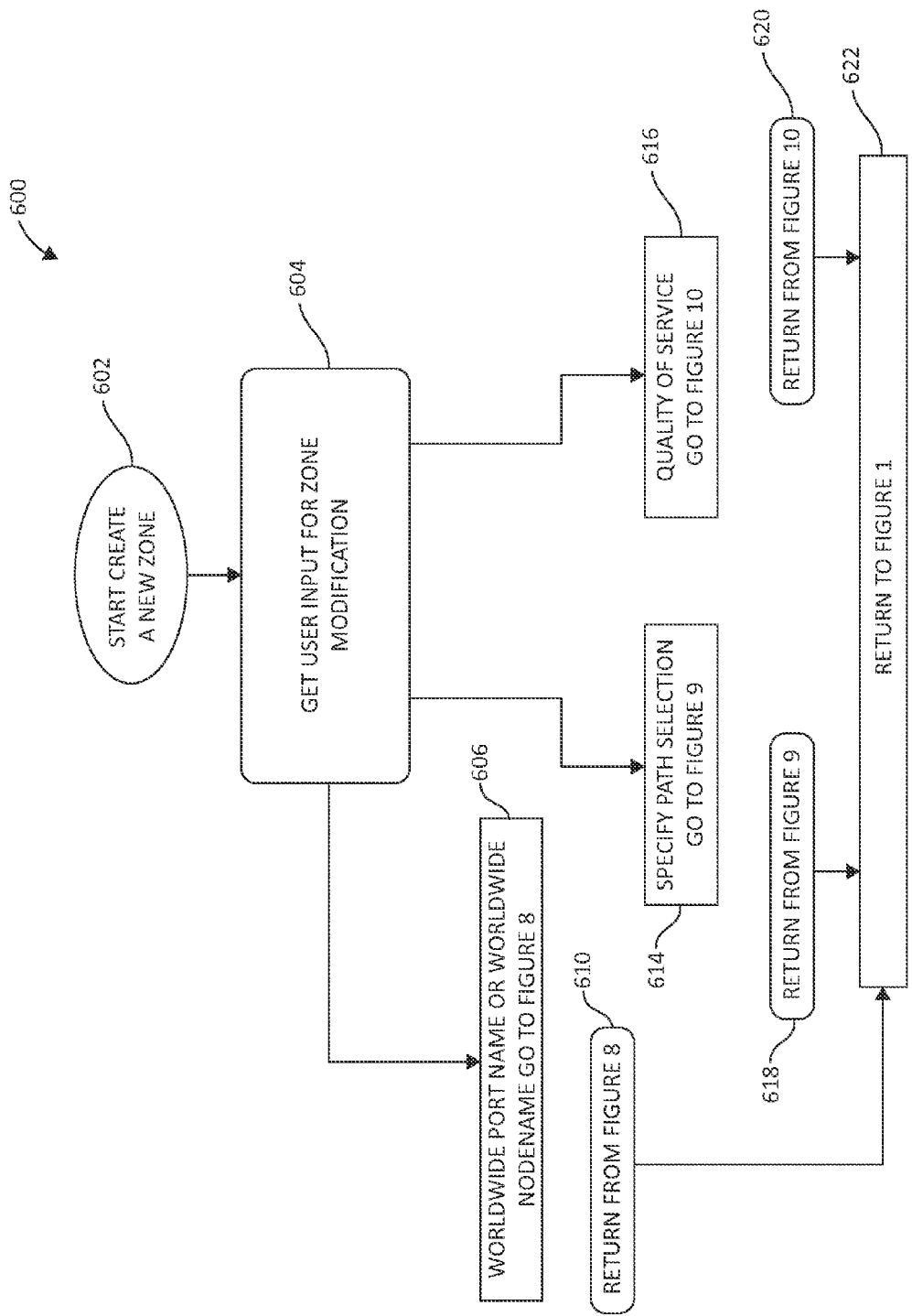
FIG. 7 is a flow chart diagram of an exemplary method for modification of an existing zone according to aspects of the present invention.

FIG. 7 is a flow chart diagram of an exemplary method 600 for modification of an existing zone according to aspects of the present invention (as a continuation of step 108, FIG. 2). Method 600 begins (step 602) with the receipt of user input for the zone modification (step 604). If the modification concerns a WWPN or WWNN zone, the method 600 moves to FIG. 8 (step 606). If the modification concerns a path selection zone, the method 600 moves to FIG. 9 (step 614). Finally, if the modification concerns a QoS zone, the method 600 moves to FIG. 10 (step 616). Following the exemplary steps as will be described in these figures, following, (step 610, 610, and 620), the method 600 returns to FIG. 1 (step 622).

Figure 8:
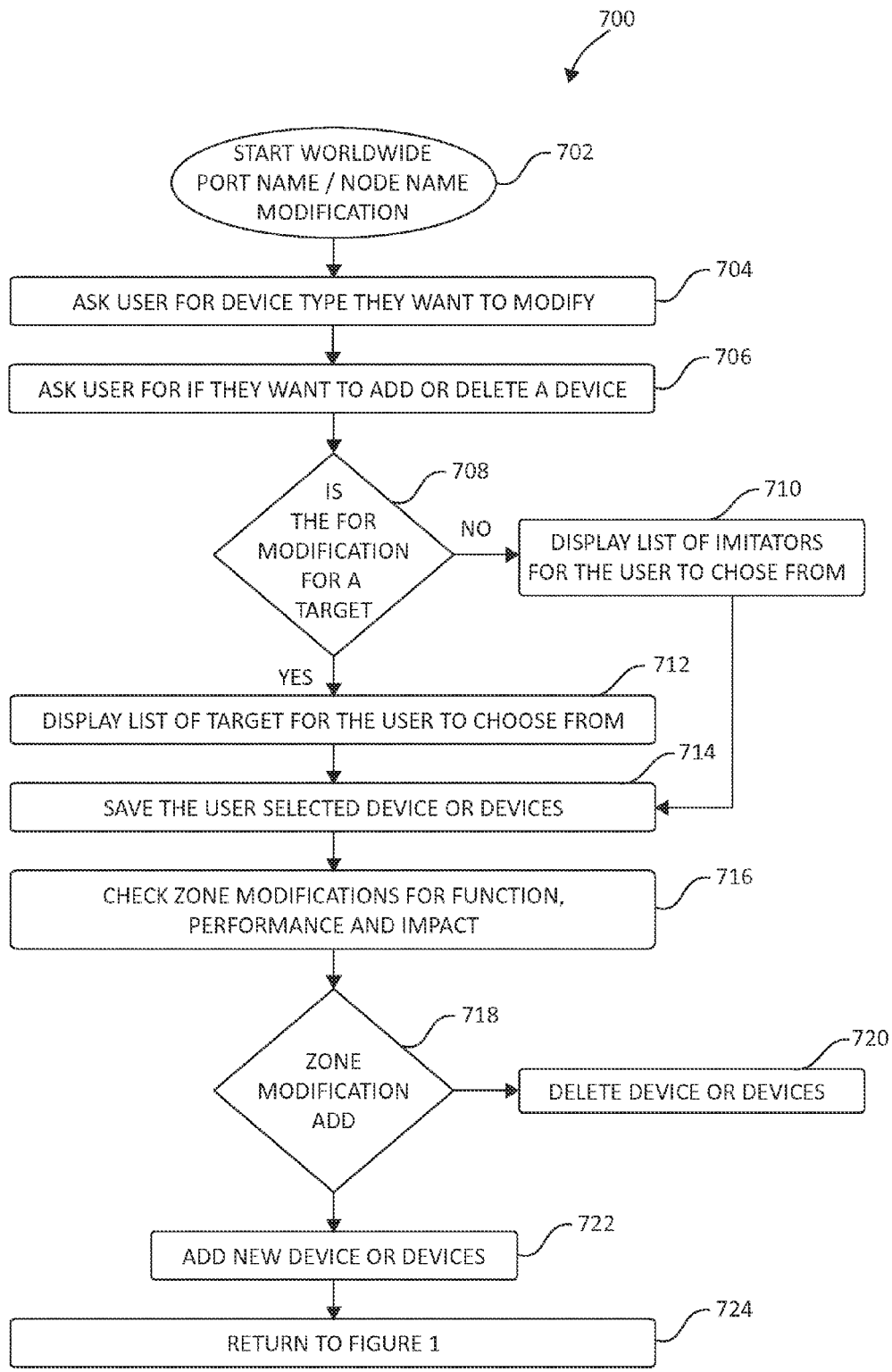
FIG. 8 is a flow chart diagram of an exemplary method for modification of an existing worldwide port name (WWPN) zone according to aspects of the present invention.

FIG. 8 is a flow chart diagram of an exemplary method 700 for modification of an existing worldwide port name (WWPN) zone according to aspects of the present invention. Method 700 begins (step 702) with a query to the user to obtain which device type desired to be modified (step 704). As a following step, the method 700 queries the user if they wish to add or delete a device (step 706). If the modification is for a target (step 708), a list of targets for the user to choose from is displayed (step 710). The user-selected device or devices are saved (step 714). The zone is checked for function, performance and other impacts as previously described (again, e.g., step 312, FIG. 3).

Returning to 708, if the modification is not for a target, the method 700 displays a list of initiators for the user to choose from (step 710), and moves to step 714 as previously described. The method 700 then performs the aforementioned checking functionality (again, e.g., step 312, FIG. 3) (step 716). Turning to step 718, depending on whether the zone adds or deletes a device or devices (step 718), the method deletes (step 720) or adds the applicable new device or devices to the modified zone (step 722). The method 700 then returns to FIG. 1 (step 724).

Figure 9:
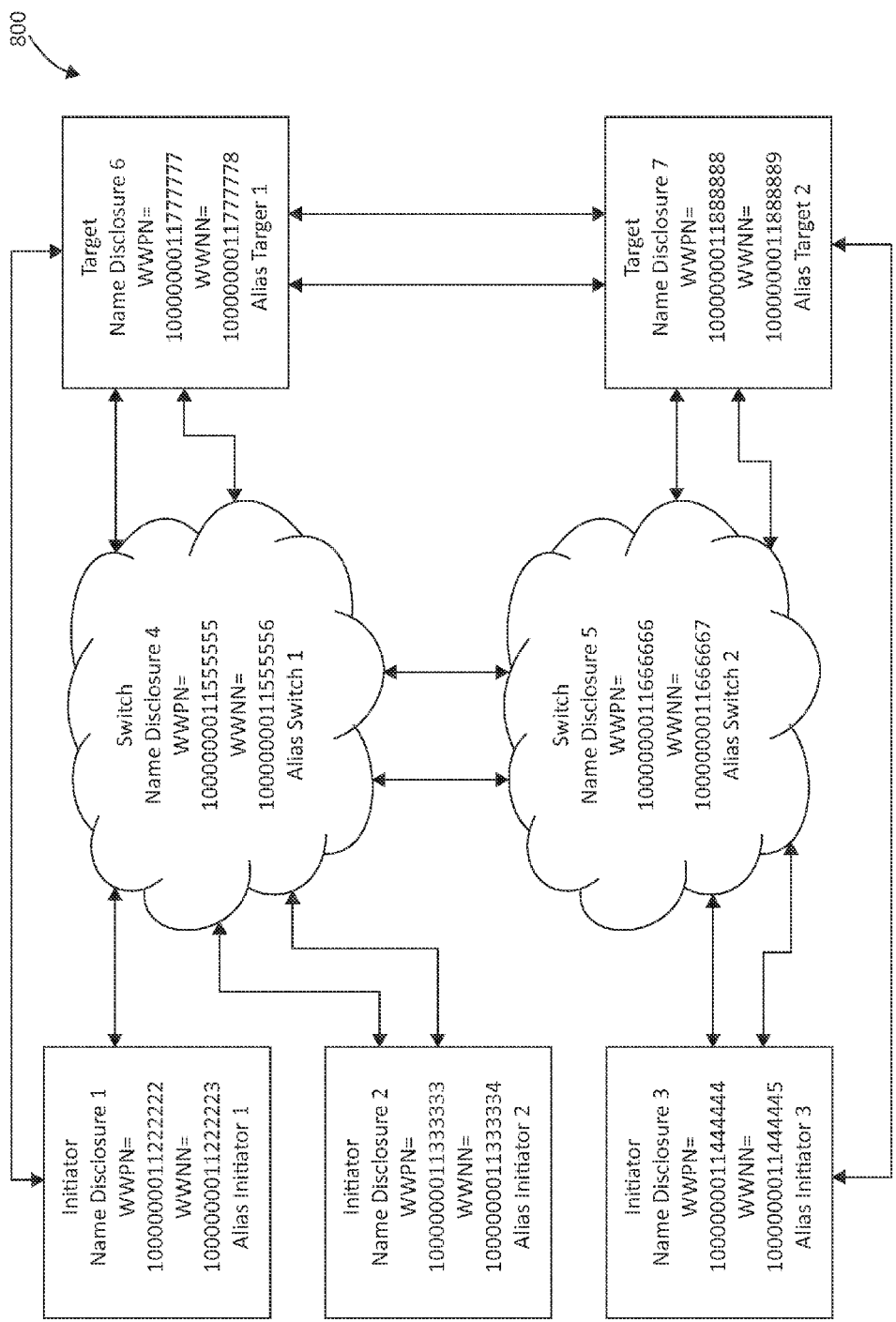
FIG. 9 is an exemplary display of a graphical user interface (GUI) according to aspects of the prevent invention.

FIG. 9 is an exemplary display 800 of a graphical user interface (GUI) according to aspects of the prevent invention. The screen 800 displays a number of initiator, targets, and interconnected switch devices as shown, including applicable WWPN and WWPN, applicable enclosure, and alias, for example. The screen 800 displays available ports or nodes to add to a zone, for example.

FIG. 10 is an additional exemplary display screen 900 of a GUI according to aspects of the present invention. The screen 900 displays a number of options in which the user is allowed to make one or more selection. In the depicted example, the available options include creation of a zone using WWPN information, creation of a zone using WWNN information, creation of a QoS zone, specification of device traffic paths, and a graphical view of a zone. In the depicted example, the user has selected creation of a zone using WWNN information.

Figure 11:
FIG. 11 is an additional exemplary display of a GUI according to aspects of the present invention.

FIG. 11 is an additional exemplary display 1000 of a GUI according to aspects of the present invention. FIG. 11 shows additional exemplary display functionality in a manner previously described by the flow chart steps in FIGS. 2-8, previously. The user is presented with information corresponding to various available initiators, WWPN information, WWNN information, and alias information. In one embodiment, for example, other useful information such as device type, device model, device capacity, number of logical units the device has, and if the device is utilizing a security mechanism may be displayed. The user may select one or more initiators to a particular zone. In the depicted example, the user has selected alias initiators 1 and 3 to add to zone 1 as shown.

Figure 12:
FIG. 12 is an additional exemplary display of a GUI according to aspects of the present invention.

FIG. 12 is an additional exemplary display 1100 of a GUI according to aspects of the present invention. Here again, FIG. 11 shows additional exemplary display functionality in a manner previously described by the flow chart steps in FIGS. 2-8, previously. Here also, a number of applicable information, such as the target name, WWPN, and WWNN information is displayed for the applicable target. In one embodiment, for example, other useful information such as device type, device model, device capacity, number of logical units the device has, and if the device is utilizing a security mechanism may be displayed to assist the user to select the appropriate target. In the depicted embodiment, a list of available targets is shown that may be selected by the user. The user has selected the alias in target 1 as shown.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for managing a computing environment using a processor device, comprising:
    gathering a plurality of information, including information for each of an available plurality of devices, hosts and virtual devices, an interconnected plurality of communication paths, and quality of service (QoS) information for at least one of the available plurality of devices, hosts, virtual devices and the interconnected plurality of communication paths;
    organizing the plurality of information into a plurality of zones according to a zoning methodology;
    performing one of an availability of checking operations to verify consistency of the plurality of information, including one of a real-time zone checking operation to determine that at least one of the plurality of zones is at least one of functional and not in conflict with at least one additional zone of the plurality of zones, a checking operation against the at least one additional zone to determine the at least one additional zone is unaffected by a change to the at least one of the plurality of zones, an assist mode operation to provide a response to a user input, and a suggestion mode operation to provide a suggested response to the user input; and
    displaying the plurality of information, including the at least one of the plurality of zones, to the user via a graphical user interface (GUI),
    wherein organizing the plurality of information into the plurality of zones according to the zoning methodology includes creating a path selection zone including a specific path of the interconnected plurality of communication paths between a starting point device and an end device by
    assigning an Nth value to a starting point device wherein the Nth value is 1,
    displaying the Nth starting point device and available links to the Nth starting point device,
    receiving a user selection for one or more of the available links to the Nth starting point device,
    saving the user selection of the one or more of the available links to the Nth starting point device,
    determining whether all links to the end device are selected, and
    incrementing the Nth value to N+1 and evaluating a next starting point device after the Nth starting point device, if all of the links to the end device are not selected.

2. The method of claim 1, wherein organizing the plurality of information into the plurality of zones according to the zoning methodology includes organizing the plurality of information into the plurality of zones according to one of a worldwide port name (WWPN), a worldwide node name (WWNN), the QoS information, a device type, a device model, a device capacity, a number of logical units associated with the at least one of the plurality of devices, and a security mechanism.

3. The method of claim 1, wherein organizing the plurality of information into the plurality of zones according to the zoning methodology further includes performing one of creating a new zone of the plurality of zones, and modifying an existing zone of the plurality of zones.

4. The method of claim 3, wherein creating the new zone of the plurality of zones further includes performing one of requesting the user for a zone name, requesting the user for one of port name and node name zoning, displaying a list of available initiators, displaying a list of targets, checking the new zone for a performance impact in the plurality of zones, and creating the new zone using one of a user-selected worldwide port name (WWPN) and worldwide node name (WWNN).

5. The method of claim 3, wherein modifying the existing zone of the plurality of zones further includes performing one of receiving a user input to indicate one of a worldwide port name (WWPN), worldwide node name (WWNN) modification, path modification, and QoS modification.

6. The method of claim 5, wherein if the user input indicates one of the WWPN and WWNN modification, and the one of the WWPN and WWNN modification is to be performed for a target, displaying a list of selectable targets in the existing zone, otherwise displaying a list of initiators in the existing zone.

7. A system for managing a computing environment, comprising:
    a processor operational in the computing environment, wherein the processor controller is adapted for:
        gathering a plurality of information, including information for each of an available plurality of devices, hosts and virtual devices, an interconnected plurality of communication paths, and quality of service (QoS) information for at least one of the available plurality of devices, hosts, virtual devices, and the interconnected plurality of communication paths,
        organizing the plurality of information into a plurality of zones according to a zoning methodology,
        performing one of an availability of checking operations to verify consistency of the plurality of information, including one of a real-time zone checking operation to determine that at least one of the plurality of zones is at least one of functional and not in conflict with at least one additional zone of the plurality of zones, a checking operation against the at least one additional zone to determine the at least one additional zone is unaffected by a change to the at least one of the plurality of zones, an assist mode operation to provide a response to a user input, and a suggestion mode operation to provide a suggested response to the user input, and
        displaying the plurality of information, including the at least one of the plurality of zones, to the user via a graphical user interface (GUI), wherein organizing the plurality of information into the plurality of zones according to the zoning methodology includes creating a path selection zone including a specific path of the interconnected plurality of communication paths between a starting point device and an end device by assigning an Nth value to a starting point device wherein the Nth value is 1, displaying the Nth startin oint device and available links to the Nth starting point device, receiving a user selection for one or more of the available links to the Nth starting point device, saving the user selection of the one or more of the available links to the Nth starting point device, determining whether all links to the end device are selected, and incrementing the Nth value to N+1 and evaluating a next starting point device after the Nth starting point device, if all of the links to the end device are not selected.

8. The system of claim 7, wherein the processor is further adapted for, pursuant to organizing the plurality of information into the plurality of zones according to the zoning methodology, organizing the plurality of information into the plurality of zones according to one of a worldwide port name (WWPN), a worldwide node name (WWNN), the QoS information, a device type, a device model, a device capacity, a number of logical units associated with the at least one of the plurality of devices, and a security mechanism.

9. The system of claim 7, wherein the processor is further adapted for, pursuant to organizing the plurality of information into the plurality of zones according to the zoning methodology, performing one of creating a new zone of the plurality of zones, and modifying an existing zone of the plurality of zones.

10. The system of claim 9, wherein the processor is further adapted for, pursuant to creating the new zone of the plurality of zones, performing one of requesting the user for a zone name, requesting the user for one of port name and node name zoning, displaying a list of available initiators, displaying a list of targets, checking the new zone for a performance impact in the plurality of zones, and creating the new zone using one of a user-selected worldwide port name (WWPN) and worldwide node name (WWNN).

11. The system of claim 9, wherein the processor is further adapted for, pursuant to modifying the existing zone of the plurality of zones, performing one of receiving a user input to indicate one of a worldwide port name (WWPN), worldwide node name (WWNN) modification, path modification, and QoS modification.

12. The system of claim 11, wherein the processor is further adapted for, if the user input indicates one of the WWPN and WWNN modification, and the one of the WWPN and WWNN modification is to be performed for a target, displaying a list of selectable targets in the existing zone, otherwise displaying a list of initiators in the existing zone.

13. The system of claim 7, wherein one of the plurality of devices is an initiator device, and the processor is operable on the initiator device.

14. A computer program product for managing a computing environment using a processor device, the computer program product comprising a non-transitory computer-readable storage medium having computer-readable program code portions stored therein, the computer-readable program code portions comprising:

a first executable portion for gathering a plurality of information, including information for each of an available plurality of devices, hosts and virtual devices, an interconnected plurality of communication paths, and quality of service (QoS) information for at least one of the available plurality of devices, hosts, virtual devices and the interconnected plurality of communication paths;

a second executable portion for organizing the plurality of information into a plurality of zones according to a zoning methodology;

a third executable portion for performing one of an availability of checking operations to verify consistency of the plurality of information, including one of a real-time zone checking operation to determine that at least one of the plurality of zones is at least one of functional and not in conflict with at least one additional zone of the plurality of zones, a checking operation against at least one additional zone to determine the at least one additional zone is unaffected by a change to the at least one of the plurality of zones, an assist mode operation to provide a response to a user input, and a suggestion mode operation to provide a suggested response to the user input; and a fourth executable portion for displaying the plurality of information, including the at least one of the plurality of zones, to the user via a graphical user interface (GUI), wherein organizing the plurality of information into the plurality of zones according to the zoning methodology includes creating a path selection zone including a specific path of the interconnected plurality of communication paths between a starting point device and an end device by assigning an Nth value to a starting point device wherein the Nth value is 1, displaying the Nth startin oint device and available links to the Nth starting point device, receiving a user selection for one or more of the available links to the Nth starting point device, saving the user selection the one or more of the available links to the Nth starting point device, determining whether all links to the end device are selected, and incrementing the Nth value to N+1 and evaluating a next starting point device after the Nth starting point device, if all of the links to the end device are not selected.

15. The computer program product of claim 14, further including a fifth executable portion for, pursuant to organizing the plurality of information into the plurality of zones according to the zoning methodology, organizing the plurality of information into the plurality of zones according to one of a worldwide port name (WWPN), a worldwide node name (WWNN), a device type, a device model, a device capacity, a number of logical units associated with the at least one of the plurality of devices, and a security mechanism.

16. The computer program product of claim 14, further including a fifth executable portion for, pursuant to organizing the plurality of information into the plurality of zones according to the zoning methodology, performing one of creating a new zone of the plurality of zones, and modifying an existing zone of the plurality of zones.

17. The computer program product of claim 16, further including a sixth executable portion for, pursuant to creating the new zone of the plurality of zones, performing one of requesting the user for a zone name, requesting the user for one of port name and node name zoning, displaying a list of available initiators, displaying a list of targets, checking the new zone for a performance impact in the plurality of zones, and creating the new zone using one of a user-selected worldwide port name (WWPN) and worldwide node name (WWNN).

18. The computer program product of claim 16, further including a sixth executable portion for, pursuant to modifying the existing zone of the plurality of zones, performing one of receiving a user input to indicate one of a worldwide port name (WWPN), worldwide node name (WWNN) modification, path modification, and QoS modification.

19. The computer program product of claim 18, further including a seventh executable portion for, if the user input indicates one of the WWPN and WWNN modification, and the one of the WWPN and WWNN modification is to be performed for a target, displaying a list of selectable targets in the existing zone, otherwise displaying a list of initiators in the existing zone.

\* \* \* \* \*